O. A. OSMONDSON.
COMBINATION POST DRILL AND PORTABLE HAND DRILL.
APPLICATION FILED JUNE 25, 1917.
1,296,691.
Patented Mar. 11, 1919.
3 SHEETS—SHEET 1.
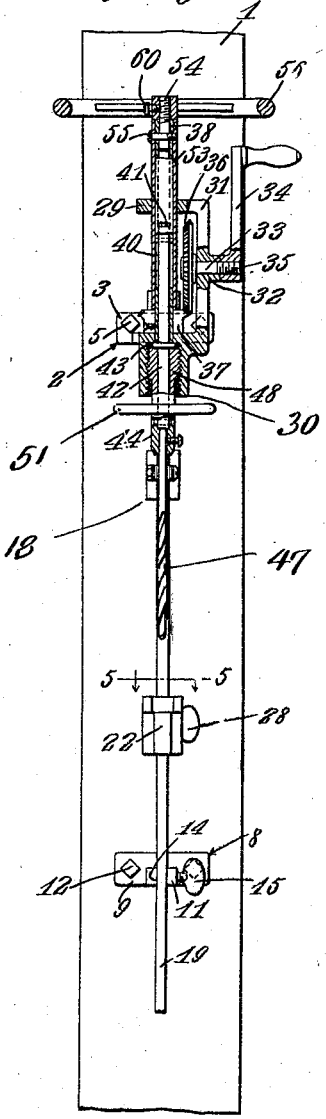
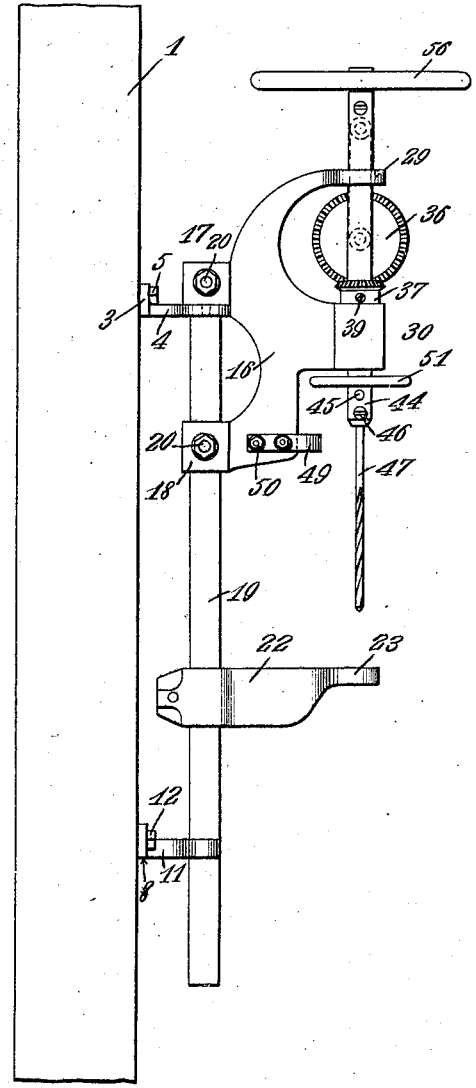
O. A. Osmondson, Inventor
Witness
By C. A. Snow & Co.
Attorney O. A. OSMONDSON.
COMBINATION POST DRILL AND PORTABLE HAND DRILL.
APPLICATION FILED JUNE 25, 1917.
1,296,691.
Patented Mar. 11, 1919.
3 SHEETS—SHEET 2.
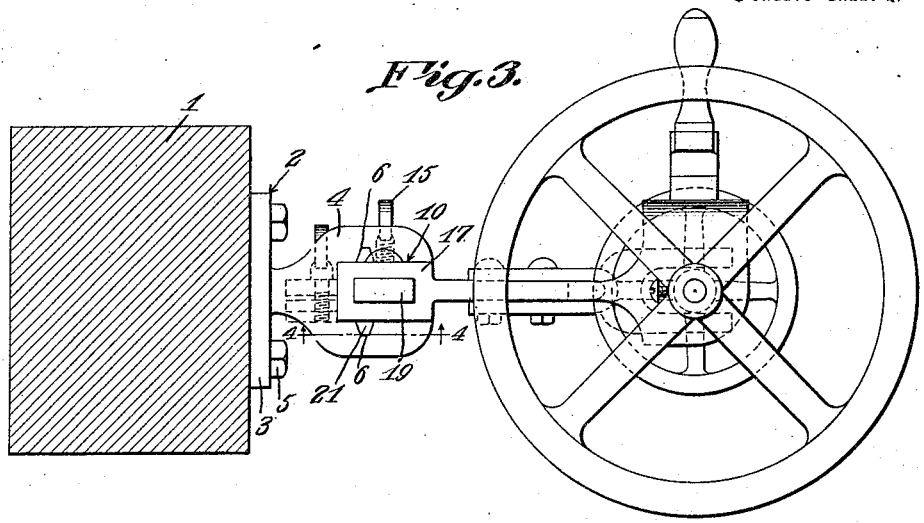
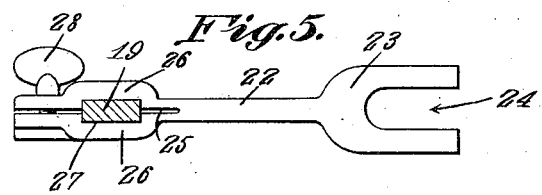
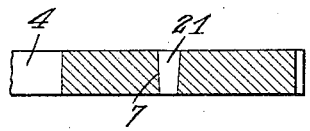
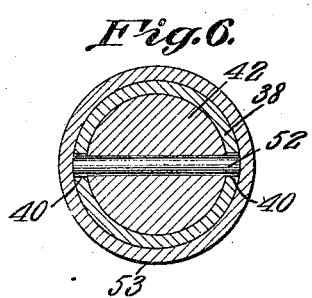
O. A. Osmondson, Inventor
By C. A. Snow & Co.
Attorney O. A. OSMONDSON.
COMBINATION POST DRILL AND PORTABLE HAND DRILL.
APPLICATION FILED JUNE 25, 1917.

1,296,691.

Patented Mar. 11, 1919.
3 SHEETS—SHEET 3.

O. A. Osmondson, Inventor

Witness

By C. A. Snow & Co.
Attorney

UNITED STATES PATENT OFFICE.

OSMOND A. OSMONDSON, OF SALINA, KANSAS.

COMBINATION POST-DRILL AND PORTABLE HAND-DRILL.

1,296,691.  Specification of Letters Patent.  Patented Mar. 11, 1919.

Application filed June 25, 1917. Serial No. 176,862.

*To all whom it may concern:*

Be it known that I, OSMOND A. OSMONDSON, a citizen of the United States, residing at Salina, in the county of Saline and State of Kansas, have invented a new and useful Combination Post-Drill and Portable Hand-Drill, of which the following is a specification.

It is the object of this invention to provide a drill which, at the will of an operator, may be used as a post drill or a bench drill, or as a hand drill.

The invention aims, specifically, to provide novel means whereby the ends above mentioned may be carried out, and, further, to provide novel means for driving and supporting the various movable parts of the structure.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed; it being understood that changes in the precise embodiment of the invention herein disclosed can be made within the scope of what is claimed, without departing from the spirit of the invention.

In the accompanying drawings:—

Figure 1 shows in front elevation, one form of a drill embodying the present improvements, parts appearing in section;

Fig. 2 is a side elevation of the structure shown in Fig. 1;

Fig. 3 is a top plan of the drill shown in Fig. 1, the supporting post appearing in section;

Fig. 4 is a section taken on the line 4—4 of Fig. 3;

Fig. 5 is a section taken on the line 5—5 of Fig. 1;

Fig. 6 is a section taken through the drill shaft and coacting parts;

Figure 7:
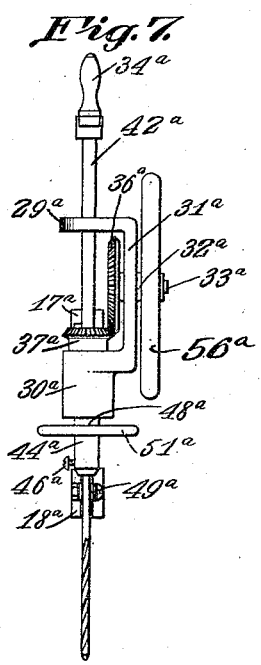
Fig. 7 is a side elevation showing a modified form of the invention.

Referring to that form of the invention which is shown in Figs. 1 to 6 both inclusive, the numeral 1 denotes a post. An upper bracket 2 is secured to the post 1. The bracket 2 includes a base 3 and an outstanding arm 4. The base 3 of the bracket is attached to the post 1 by means of securing elements 5. In the end of the arm 4 there is fashioned a slot 10. The arm 4 is provided with notches 6 which open into the slot 10. As shown in Fig. 4, the walls of the notches 6 converge at 7, as they extend downwardly. A lower bracket 8 is attached to the post 1. The bracket 8 includes a base 9 and an outstanding arm 11. Securing elements 12 connect the base 9 of the bracket 8 with the post 1. In its end, the arm 11 has a slot 14. The slot 14 in the arm 11 is not so wide as is the slot 10 in the arm 4 of the upper bracket. The arm 11 of the lower bracket 8 carries a set screw 15.

The invention comprises a frame in the form of a plate 16 including a main or upper socket 17 and a secondary or lower socket 18. Mounted in the sockets 17 and 18 is a bar 19. The sockets 17 and 18 carry securing elements 20 which hold the bar 19 removably in place in the sockets. The upper socket 17 has laterally projecting lugs 21. The numeral 22 denotes a work table having a flattened outer end 23 provided with a slot 24 through which the drill, hereinafter mentioned, is adapted to work, as the drill passes through the material. In its rear end, the work table 22 is provided with a longitudinal slot 25 forming resilient jaws 26 supplied on their inner faces with coöperating notches defining an opening 27 in which the bar 19 is received. A clamp screw 28 is threaded into the rear ends of the jaws 26. It will be obvious that the work table 22 may be adjusted along the bar 19, and by tightening up the screw 28, the jaws 26 will be made to grip the bar 19, and thus the work table 22 may be held in any position to which it may have been adjusted.

In order to assemble the bar 19 and parts carried thereby with the brackets 2 and 8, the upper socket 17 is fitted into the slot 10 of the arm 11, the lugs 21 on the socket 17 being received in the notches 6 of the arm 4. Because the walls of these notches 6 converge as shown at 7, as they extend downwardly, and because the lugs 21 are shaped to fit the notches, the bar 19 and parts carried thereby can not slide downwardly. The bar 19 fits closely in the slot 14 of the arm 11 of the lower bracket 8 and is held therein by the set screw 15.

The frame or plate 16 is provided at its upper end with a horizontal head 29. Below the head 29, the plate 16 carries a bearing 30. The head 29 is connected with the bearing 30 by means of a side arm 31 having a bearing boss 32. A shaft 33 is journaled in the bearing boss 32. A handle 34 is held removably on the outer end of the shaft 33. Preferably, but not necessarily, the handle 34 is threaded as shown at 35 onto the shaft 33. Secured to the inner end of the shaft 33 is a beveled gear wheel 36. The beveled gear wheel 36 meshes into a beveled pinion 37 supported on the upper end of the bearing 30. An inner tube 38 extends through the beveled pinion 37 into the upper end of the bearing 30. The inner tube is secured as shown at 39 to the beveled pinion 37. Above the beveled pinion 37, the inner tube 38 is provided with opposed, longitudinally extended slots 40. The inner tube 38 may also be provided with transverse oil slots 41 permitting a lubricant to find its way within the inner tube.

A drill shaft 42 is located within the inner tube 38. The drill shaft 42 is provided adjacent its lower end with an enlargement 43. The enlargement 43 is located within the bearing 30. Mounted on the lower end of the drill shaft 42 is a chuck 44. The chuck 44 is secured to the drill shaft 42 as shown at 45 and carries a set screw 46 adapted to hold a drill 47 in the chuck. A screw 48 is mounted to rotate on the drill shaft 42 between the enlargement 43 and the chuck 44. The screw 48 carries a hand wheel 51. The screw 48 is threaded into the bearing 30. A U-shaped stop 49 is straddled onto the plate or frame 16 near to its lower end and is held thereto by securing elements 50. The drill shaft 42 carries a removable cross pin 52. The ends of the cross pin 52 are mounted to reciprocate in the longitudinal slots 40 of the inner tube 38. The inner tube 38 is surrounded by an outer tube 53. The outer tube 53 serves to hold the pin 52 in place in the drill shaft 42. A stub shaft 54 is mounted in the upper end of the inner tube 38. A securing element 55 passes through the upper ends of the tubes 38 and 53 and holds the stub shaft 54 in place. A fly wheel 56 is threaded onto the upper end of the stub shaft 54 and may be held in place by a set screw 60.

The work is supported on the table 22. When the shaft 33 is rotated by means of the crank 34, the beveled gear wheel 36, meshing into the beveled pinion 37, rotates the inner tube 38. When the inner tube 38 is rotated, the drill shaft 42 will be rotated also, because these elements are connected for simultaneous rotation, by means of the pin 52. Since the outer tube 53 and the stub shaft 54 are connected with the inner tube 38 by means of the securing element 55, and since the fly wheel 56 is attached to the stub shaft 54 by means of the set screw 60, the fly wheel 56 will fulfil its well understood office.

In order to feed the drill 47 downwardly, the screw 48 is rotated by means of the hand wheel 51, and when the screw, being threaded into the bearing 30, is rotated, the drill shaft 42, along with the drill 47, will be raised or lowered, depending on the direction of rotation of the wheel 51. The enlargement 43 on the one hand, and the chuck 44 on the other hand, connect the screw 48 with the drill shaft 42 for simultaneous longitudinal movement. It is to be observed that in this form of the invention, the weight of the fly wheel 56 is carried by the outer tube 53, the latter being supported on the beveled pinion 37 which, in its turn, is supported on the bearing 30. The weight of the fly wheel 56, therefore, is not carried by the drill shaft 42. The outer tube 53 is journaled in the head 29, as clearly shown in the drawings.

In Figs. 1 and 2, the structure is shown set up for use as a post drill. It will be obvious, however, that the structure, arranged as shown in Figs. 1 and 2, may be used as a bench drill. When it is desired to use the structure as a hand drill, the bar 19 is detached from the brackets 8 and 2. If extreme portability and lightness are desired, then the frame 16 may be detached from the bar 19, by removing the securing elements 20 which connect the sockets 18 and 17 with the bar 19. Ordinarily, when the structure is used as a hand drill, the frame or plate 16 and parts carried thereby will be detached from the bar 19, as aforesaid.

Figure 8:
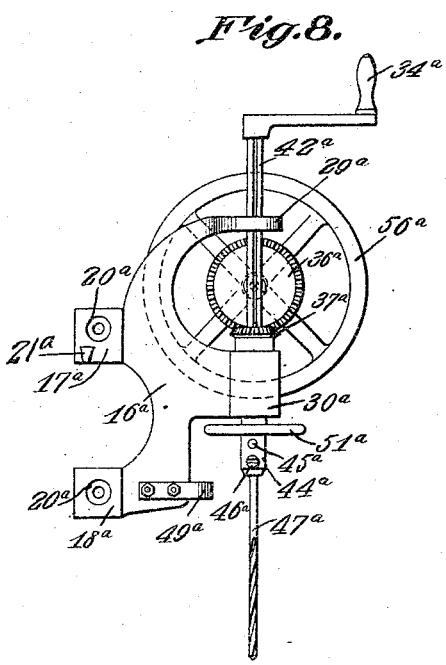
Fig. 8 is an elevation wherein the structure shown in Fig. 7 is viewed at right angles to the showing of Fig. 7.
Figure 9:
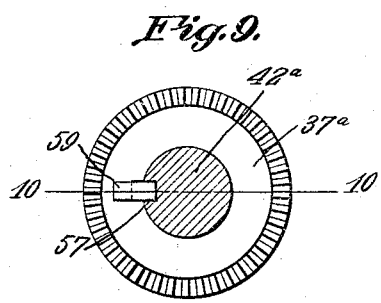
Fig. 9 is a cross section taken through the drill shaft and showing the means whereby the drill shaft is operatively connected with the driving pinion.
Figure 10:
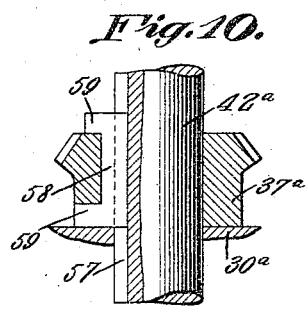
Fig. 10 is a section taken approximately on the line 10—10— of Fig. 9.

In Figs. 7, 8, 9 and 10 of the drawings, a simplified form of the invention is shown. In these figures, parts hereinbefore described have been designated by numerals previously used with the suffix "a". In this form of the invention, the drill shaft 42$^a$ is journaled directly in the head 29$^a$ and in the beveled pinion 37$^a$. The drill shaft 42$^a$ has a keyway 57 engaged by a key 58 carried by the beveled pinion 37, and having extensions 59 which engage the upper and lower surfaces of the member 37$^a$. In this form of the invention, an extreme downward feed of the drill 47 is prevented by the engagement between the wheel 51$^a$ and the stop 49$^a$, the same observation holding true with regard to the hand wheel 51 and the stop 49 shown in that form of the invention which is delineated in Figs. 1 and 2. It is to be understood that the structure shown in Figs. 7 and 8 is adapted to be mounted on a member like the bar 19, and to be used in connection with such parts as the brackets 8 and 2.

It will be understood that when the device is used as a post drill, the fly wheel 56 is mounted on the stub shaft 54, the crank handle 34 being connected with the shaft 35. The parts are shown thus arranged in Fig. 1. When, however, the device is to be used as a hand drill, then, ordinarily, the handle 34ª is mounted on the end of the shaft 42ª, the fly wheel 56ª being mounted on the shaft 33ª. The parts are shown thus disposed in Figs. 7 and 8.

Having thus described the invention, what is claimed, is:—

1. A device of the class described comprising spaced brackets having slots; a bar received in the slot of one bracket; a frame including a socket receiving the bar, the socket being received in the slot of the other bracket, the socket and said other bracket having coacting elements limiting the endwise movement of the bar with respect to the brackets; a drilling mechanism carried by the frame; and a work table carried by the bar and coacting with the drilling mechanism.

2. In a device of the class described, a frame; a rotatable element supported on the frame; an inner tube carried by the rotatable element; a drill shaft mounted to slide endwise in the inner tube; means for connecting the drill shaft and the inner tube for simultaneous rotation; means for actuating the rotatable element; an outer tube surrounding the inner tube and supported on the rotatable element; a fly wheel carried by the outer tube and supported by the outer tube independently of the drill shaft; means carried by the frame for actuating the rotatable element; and means for feeding the drill shaft longitudinally.

3. In a device of the class described, a frame; a beveled pinion supported on the frame; a beveled gear wheel meshing into the pinion; a first shaft journaled in the frame and carrying the beveled gear wheel; an inner tube journaled in the frame and connected with the pinion; a drill shaft mounted in the inner tube; a pin extended through the drill shaft, the inner tube having a slot wherein the pin is received, to connect the drill shaft with the inner tube for simultaneous rotation; an outer tube journaled in the frame and surrounding the inner tube, the outer tube being supported on the pinion and engaging the pin to hold the same in place; a fly wheel and an actuating member; and means for connecting the fly wheel and the actuating member interchangeably with the outer tube and with the first shaft, at the will of an operator.

In testimony that I claim the foregoing as my own, I have hereto affixed my signature in the presence of two witnesses.

OSMOND A. OSMONDSON.

Witnesses:
W. M. HAMSHER,
L. A. JUDY.

Copies of this patent may be obtained for five cents each, by addressing the "Commissioner of Patents, Washington, D. C."